US011516662B2

(12) United States Patent
Motupalli et al.

(10) Patent No.: US 11,516,662 B2
(45) Date of Patent: Nov. 29, 2022

(54) PERFORMING AUTHENTICATED ACTIONS WITHOUT INTERNET CONNECTIVITY

(71) Applicant: Amazon Technologies, Inc., Seattle, WA (US)

(72) Inventors: Sriharsha Motupalli, Hyderabad (IN); Srivathsa M S, Hyderabad (IN); Swetha Morthala, Hyderabad (IN); Avipsa Nayak, Bhubaneswar (IN); Manish Ramesh Bhatia, Hyderabad (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 168 days.

(21) Appl. No.: 16/818,474

(22) Filed: Mar. 13, 2020

(65) Prior Publication Data

US 2021/0289355 A1   Sep. 16, 2021

(51) Int. Cl.
*H04W 12/062* (2021.01)
*H04W 12/069* (2021.01)
*H04L 9/32* (2006.01)
*H04L 9/40* (2022.01)
*H04W 60/02* (2009.01)

(52) U.S. Cl.
CPC ......... *H04W 12/062* (2021.01); *H04L 9/3213* (2013.01); *H04L 63/0853* (2013.01); *H04W 12/069* (2021.01); *H04W 60/02* (2013.01)

(58) Field of Classification Search
CPC . H04W 12/062; H04W 12/069; H04W 60/02; H04W 12/06; H04L 9/3213; H04L 63/0853; H04L 29/06; H04L 9/32
See application file for complete search history.

(56) References Cited

U.S. PATENT DOCUMENTS

| 8,620,826 | B2 | 12/2013 | Coughlin et al. | |
| 8,973,120 | B2 | 3/2015 | Coughlin et al. | |
| 9,992,638 | B1 * | 6/2018 | Oyekanmi | H04W 12/06 |
| 2004/0148357 | A1 * | 7/2004 | Corrigan | H04L 67/04 |
| | | | | 709/206 |

(Continued)

FOREIGN PATENT DOCUMENTS

| EP | 3119067 A1 | 1/2017 | |
| WO | WO-2016050990 A1 * | 4/2016 | ............ H04W 12/37 |
| WO | 2016083906 A1 | 6/2016 | |

OTHER PUBLICATIONS

International Search Report and Written Opinion for International Application No. PCT/US2021/021661 dated May 11, 2021.

*Primary Examiner* — Techane Gergiso

(74) *Attorney, Agent, or Firm* — Thomas | Horstemeyer, LLP

(57) ABSTRACT

Disclosed are various embodiments for performing authenticated actions when Internet connectivity is not available. An application executed in a first computing device determines that an authenticated action is requested to be performed. The application determines that Internet connectivity is unavailable to the first computing device. The application initiates the authenticated action using a communication channel that connects the first computing device to a second computing device. The Internet is inaccessible through the communication channel.

20 Claims, 8 Drawing Sheets

(56) References Cited

U.S. PATENT DOCUMENTS

| | | | |
|---|---|---|---|
| 2007/0167178 A1* | 7/2007 | Al-Harbi | G06Q 10/02 709/206 |
| 2011/0131638 A1* | 6/2011 | Kan | G06Q 20/40 709/206 |
| 2015/0044987 A1* | 2/2015 | Menon | H04W 8/20 455/406 |
| 2015/0100473 A1 | 4/2015 | Manoharan et al. | |
| 2015/0371216 A1* | 12/2015 | Olawale | G06Q 20/3255 705/39 |
| 2016/0173419 A1* | 6/2016 | Mendiola | H04L 51/214 709/206 |
| 2017/0193498 A1* | 7/2017 | Metral | G06Q 20/405 |
| 2017/0300899 A1* | 10/2017 | Balaga | G06Q 20/382 |
| 2017/0331820 A1* | 11/2017 | Kirschbaum | H04W 12/02 |
| 2021/0133897 A1* | 5/2021 | Waweru | G06N 20/00 |
| 2021/0248586 A1* | 8/2021 | Gorgy | G06Q 20/3255 |

\* cited by examiner

PERFORMING AUTHENTICATED ACTIONS WITHOUT INTERNET CONNECTIVITY

BACKGROUND

The Global System for Mobile Communications (GSM) is a standard for digital cellular telephone networks. Although GSM is a second-generation technology, GSM functionality continues to be widely supported in subsequent generation technologies, such as the Universal Mobile Telecommunications System (UMTS) and Long-Term Evolution (LTE). Unstructured Supplementary Service Data (USSD) is one communications protocol used by GSM devices to communicate with systems of the mobile network operator. In one example, a USSD message may start with an asterisk (*) and be followed by digits that contain commands or data. Groups of digits may be separated by additional asterisks. The message is terminated with a hash symbol (#). USSD messages may contain up to 182 alphanumeric characters. USSD messages may be initiated by the mobile device or by the mobile network operator.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
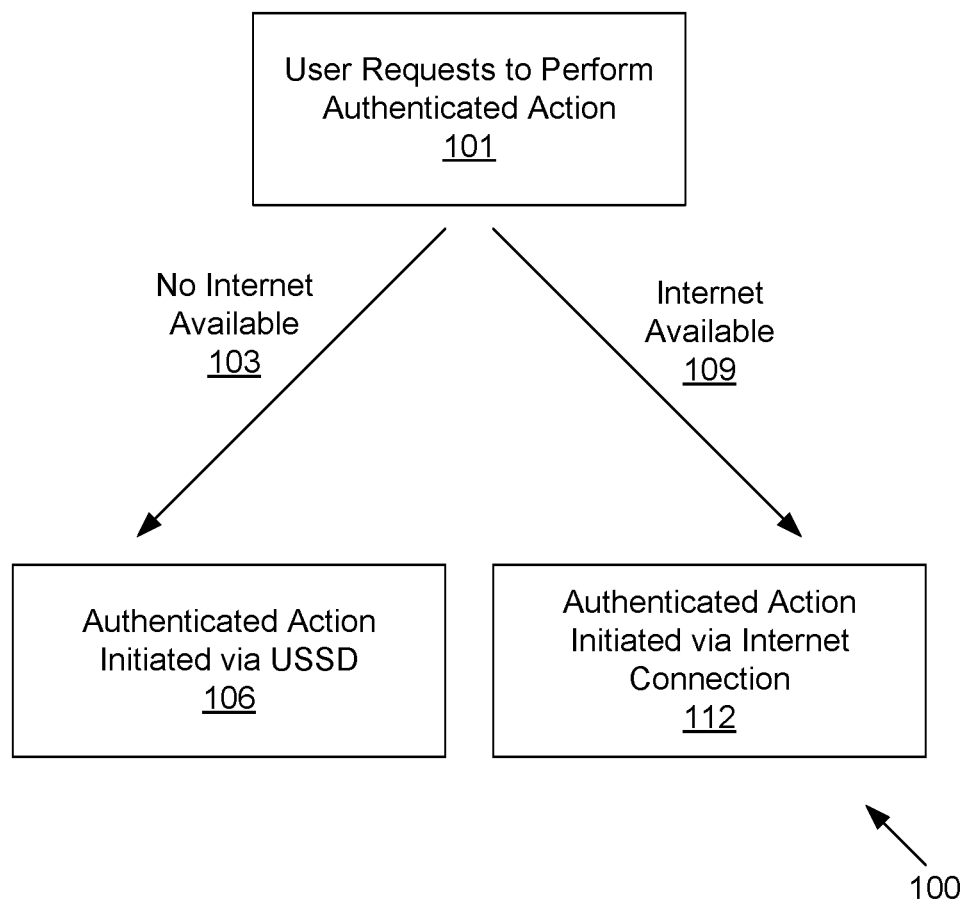
FIG. 1 is a drawing of an example scenario involving performing an authenticated action according to various embodiments of the present disclosure.

Disclosed are various embodiments for performing authenticated actions when Internet connectivity is unavailable. Although mobile network service is available in most locations, mobile data may be unavailable. As an example, the cellular signal at a location may be degraded to a point that mobile data, and thus the Internet, is not available. As another example, a particular cell site may not be equipped to support mobile data, or the mobile data service may be misconfigured or down. Without Internet connectivity, users are not able to perform authenticated actions with their mobile devices, such as making payments, adding items to shopping carts, completing item orders, and so forth.

However, a weak cellular signal can be used to send and receive Short Message Service (SMS) messages, or in some cases, even voice calls. In particular, Unstructured Supplementary Service Data (USSD) messages may be sent and received when mobile data is unavailable. Also, sometimes users may intentionally disable mobile data on their devices or may have mobile data disabled for their devices by the mobile network operator because of their account status. In such instances, SMS, USSD, and voice services may be still available, even if mobile data is not.

Various embodiments of the present disclosure introduce the use of USSD as a failover communication channel to perform authenticated actions when Internet access (e.g., mobile data or Wi-Fi) is not available. If a user seeks to make a payment, complete an item order, or perform another action, and the Internet is determined to be unavailable, embodiments of the present disclosure allow the authenticated action to be completed via USSD. The principles of the present disclosure may be extended to the failover use of SMS messages, voice calls, and/or other mobile communications protocols that do not provide Internet access.

As one skilled in the art will appreciate in light of this disclosure, certain embodiments may be capable of achieving certain advantages, including some or all of the following: (1) improving the functionality of computer systems and networks by allowing authenticated operations to proceed when Internet connectivity is limited or unavailable, (2) improving the security of computer systems and networks by authenticating actions through the use of pre-shared encryption keys or authentication tokens, (3) improving the user experience by avoiding Internet-related errors when performing authenticated actions, (4) improving the user experience by rendering confirmation user interfaces that are tailored to a current status of Internet connectivity, (5) reducing computing resource consumption (in terms of memory, processing time, bandwidth, etc.) by avoiding errors relating to a lack of Internet connectivity when an authenticated action is requested, (6) reducing computing resource consumption (in terms of memory, processing time, bandwidth, etc.) by omitting non-functional user interface components from confirmation user interfaces when Internet connectivity is unavailable, and so forth.

Turning now to FIG. 1, shown is a drawing of an example scenario 100 of performing an authenticated action according to one or more embodiments. In the example scenario 100, at 101, a user requests to perform an authenticated action using a computing device. For example, the user may request to add an item to a shopping cart, place an order, make a payment, or perform another type of authenticated action. At 103, it is determined that no Internet connection is available to the computing device. Consequently, at 106, the computing device initiates the authenticated action via USSD. If instead, at 109, it is determined that an Internet connection is available to the computing device, the computing device initiates the authenticated action via an Internet connection at 112. In the following discussion, a general description of the system and its components is provided, followed by a discussion of the operation of the same.

Figure 2:
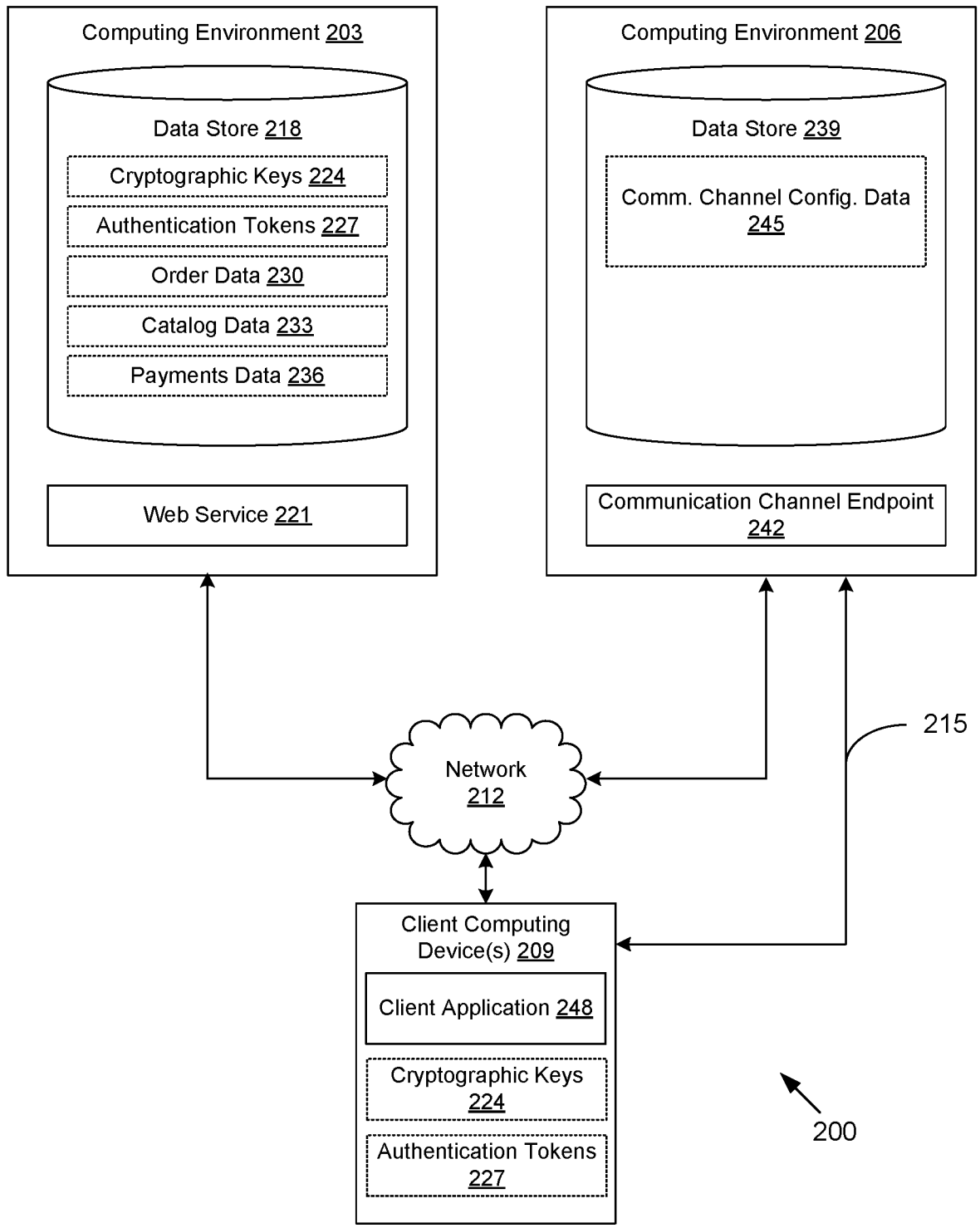
FIG. 2 is a schematic block diagram of a networked environment according to various embodiments of the present disclosure.

With reference to FIG. 2, shown is a networked environment 200 according to various embodiments. The networked environment 200 includes a computing environment 203, a computing environment 206, and one or more client computing devices 209, which may be in data communication with each other via a network 212. The network 212 includes, for example, the Internet, intranets, extranets, wide area networks (WANs), local area networks (LANs), wired networks, wireless networks, cable networks, satellite networks, or other suitable networks, etc., or any combination of two or more such networks.

Further, the client computing device 209 may be in data communication with the computing environment 206 via a separate communication channel 215. The separate communication channel may correspond to USSD, SMS, a voice call, or another type of communication channel that does not provide access to the Internet. USSD is defined under the 3rd Generation Partnership Project (3GPP) specification 23.090, Release 15, dated Jun. 22, 2018, and other versions. USSD enables communication over LTE, UMTS, and GSM cellular networks between the mobile device and systems of the mobile network operator, which does not provide Internet access. USSD message may start with an asterisk (*) and be followed by digits that contain commands or data. Groups of digits may be separated by additional asterisks. The message is terminated with a hash symbol (#). USSD messages may contain up to 182 alphanumeric characters. USSD messages may be initiated by the mobile device or by the mobile network operator.

USSD differs from other communication channels in that it may be available even when cellular signal strength is relatively low such that mobile data is unavailable. In some cases, USSD may be available even when a user has exceeded a mobile data allowance, has turned off mobile data, or has not subscribed to mobile data. Likewise, USSD may be available when Wi-Fi network access is unavailable.

The computing environments 203, 206 may comprise, for example, a server computer or any other system providing computing capability. Alternatively, the computing environments 203, 206 may employ a plurality of computing devices that may be arranged, for example, in one or more server banks or computer banks or other arrangements. Such computing devices may be located in a single installation or may be distributed among many different geographical locations. For example, the computing environments 203, 206 may include a plurality of computing devices that together may comprise a hosted computing resource, a grid computing resource, and/or any other distributed computing arrangement. In some cases, the computing environments 203, 206 may correspond to an elastic computing resource where the allotted capacity of processing, network, storage, or other computing-related resources may vary over time.

The computing environment 203 may be operated by or for an electronic commerce provider, a payment provider, and/or other entities that may perform online actions for users. Various applications and/or other functionality may be executed in the computing environment 203 according to various embodiments. Also, various data is stored in a data store 218 that is accessible to the computing environment 203. The data store 218 may be representative of a plurality of data stores 218 as can be appreciated. The data stored in the data store 218, for example, is associated with the operation of the various applications and/or functional entities described below.

The components executed on the computing environment 203, for example, include a web service 221 and other applications, services, processes, systems, engines, or functionality not discussed in detail herein. The web service 221 is executed to authenticate client computing devices 209 as being associated with user accounts and to perform actions as requested by the client computing devices 209. To this end, the web service 221 may support an application programming interface (API) for communication with one or more applications executed on the client computing device 209 for scenarios in which the web service 221 is accessible to the client computing device 209 via the network 212. Further, the web service 221 may support an API for communication with systems of a mobile network operator for scenarios in which the web service 221 is not accessible to the client computing device 209 via the network 212. In some embodiments, the web service 221 may generate network pages, such as web pages or other forms of network content, and return the network pages to the client computing device 209 for rendering for display.

The data stored in the data store 218 may include, for example, cryptographic keys 224, authentication tokens 227, order data 230, catalog data 233, payments data 236, and potentially other data. The cryptographic keys 224 may be used to encrypt and decrypt communications between the web service 221 and the client computing device 209, which may traverse the network 212 and/or the communication channel 215. The cryptography performed using the cryptographic keys 224 may be separate from Secure Sockets Layer (SSL) or Transport Layer Security (TLS) and may be performed on messages not transmitted via Hypertext Transfer Protocol Secure (HTTPS). For example, the communication channel 215 may not support HTTPS.

In one implementation, the cryptographic keys 224 include a symmetric key that is pre-shared to the client computing device 209 when an Internet connection through the network 212 is available. One non-limiting example of a symmetric key may correspond to a key supporting the Advanced Encryption Standard (AES). In another implementation, the cryptographic keys 224 may correspond to public/private key pairs, such that the client computing device 209 may have a public key to encrypt and a private key to decrypt, and the computing environment 203 may have a corresponding private key to decrypt communications encrypted by the public key, and a corresponding public key to encrypt communications for decryption by the private key. The web service 221 may employ the cryptographic keys 224 in order to determine the authenticity of the action requested to be performed in a message. In various implementations, the cryptographic keys 224 may be rotated or replaced periodically or in response to particular events.

The authentication tokens 227 may correspond to data that may be included within a message sent via the communication channel 215 to authenticate the message. To this end, the authentication tokens 227 may be pre-shared to the client computing device 209 when an Internet connection through the network 212 is available. In one implementation, multiple authentication tokens 227 may be pre-shared to the client computing device 209. The authentication tokens 227 may have a limited lifetime, and in some implementations, individual authentication tokens 227 may be useable for a single use or another limited number of uses. For example, the authentication tokens 227 may correspond to authentication codes, such as numerical codes or character strings. The authentication tokens 227 may be static or dynamic.

The order data 230 may include data descriptive of an order placed through the web service 221 for an item or a collection of multiple items. Such items may correspond to products, goods, services, digital downloads, and so forth. The order data 230 may include data relating to tentative orders, such as shopping carts, wish lists, gift registries, and so on.

The catalog data 233 may include data relating to items that are available for order via the web service 221. Such data may include, for example, prices, titles, weights, hazardous classifications, import/export restrictions, images, options, descriptions, fragility, inventory availability, and/or other information.

The payments data 236 may include data relating to the ability to make payments via the web service 221. The payments data 236 may store data relating to one or more payment instruments, such as credit cards, debit cards, bank accounts, gift cards, stored value accounts, and/or other payment instruments. Payments may be made for orders, for bills, to transfer value to another person, to pay for one or more items in a physical store, or for other purposes.

The computing environment 206 may be operated by a mobile network operator. Various applications and/or other functionality may be executed in the computing environment 206 according to various embodiments. Also, various data is stored in a data store 239 that is accessible to the computing environment 206. The data store 239 may be representative of a plurality of data stores 239 as can be appreciated. The data stored in the data store 239, for example, is associated with the operation of the various applications and/or functional entities described below.

The components executed on the computing environment 206, for example, include a communication channel endpoint 242 and other applications, services, processes, systems, engines, or functionality not discussed in detail herein. The communication channel endpoint 242 is executed to receive communications via the communication channel 215 and to forward them to the web service 221 via the network 212. For example, the communication channel endpoint 242 may receive USSD messages, SMS messages, data encoded within a voice message, etc., determine the destination web service 221 out of potentially a plurality of different web services 221, and then forward the messages via the network 212 to the destination web service 221. The communication channel endpoint 242 may then provide a confirmation to the client computing device 209 via the communication channel 215 that the message has been successfully forwarded. The confirmation may include additional data received from the web service 221 via the network 212 relating to confirmation that a requested action was performed.

The data stored in the data store 239 may include, for example, communication channel configuration data 245 and potentially other data. The communication channel configuration data 245 may define valid formats for data received via the communication channel 215 so that the message type may be identified, potentially transformed, and forwarded to the web service 221 via an API. For example, the communication channel configuration data 245 may define certain characters or numbers in a message as pertaining to a particular web service 221 and indicate how data in the message should be sent to the particular web service 221. The communication channel configuration data 245 may also configure how confirmations are to be provided via the communication channel 215 to the client computing device 209.

The client computing device 209 is representative of a plurality of client devices that may be coupled to the network 212. The client computing device 209 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client computing device 209 may include a cellular transceiver in order to communicate with the communication channel endpoint 242 via the communication channel 215. Alternatively, the client computing device 209 may be coupled to another device such as a Wi-Fi hotspot, an air card, a mobile phone, etc., via tethering via a personal area network connection (e.g., via BLUETOOTH, Near-Field Communication (NFC), or Wi-Fi) or via a communication cable, where the other device has a cellular transceiver to communicate with the communication channel endpoint 242 via the communication channel 215. The client computing device 209 may include a display such as liquid crystal display (LCD) displays, gas plasma-based flat panel displays, organic light emitting diode (OLED) displays, electrophoretic ink (E ink) displays, LCD projectors, or other types of display devices, etc. The client computing device 209 may include sensors such as cameras, barcode scanners, microphones, and so forth.

The client computing device 209 may be configured to execute various applications such as a client application 248 and/or other applications. The client application 248 may be executed in a client computing device 209, for example, to access network content served up by the computing environment 203 and/or other servers, thereby rendering a user interface on the display. To this end, the client application 248 may comprise, for example, a browser, a dedicated application, etc., and the user interface may comprise a network page, an application screen, etc. For example, the client application 248 may correspond to a payment application, a shopping application, and/or other types of applications. The client application 248 may cache or store various data on the client computing device 209 including cryptographic keys 224, authentication tokens 227, item data, or other user interface data for use in generating user interfaces when network connectivity to the web service 221 is unavailable. The client computing device 209 may be configured to execute applications beyond the client application 248 such as, for example, email applications, social networking applications, word processors, spreadsheets, and/or other applications.

Figure 3A:
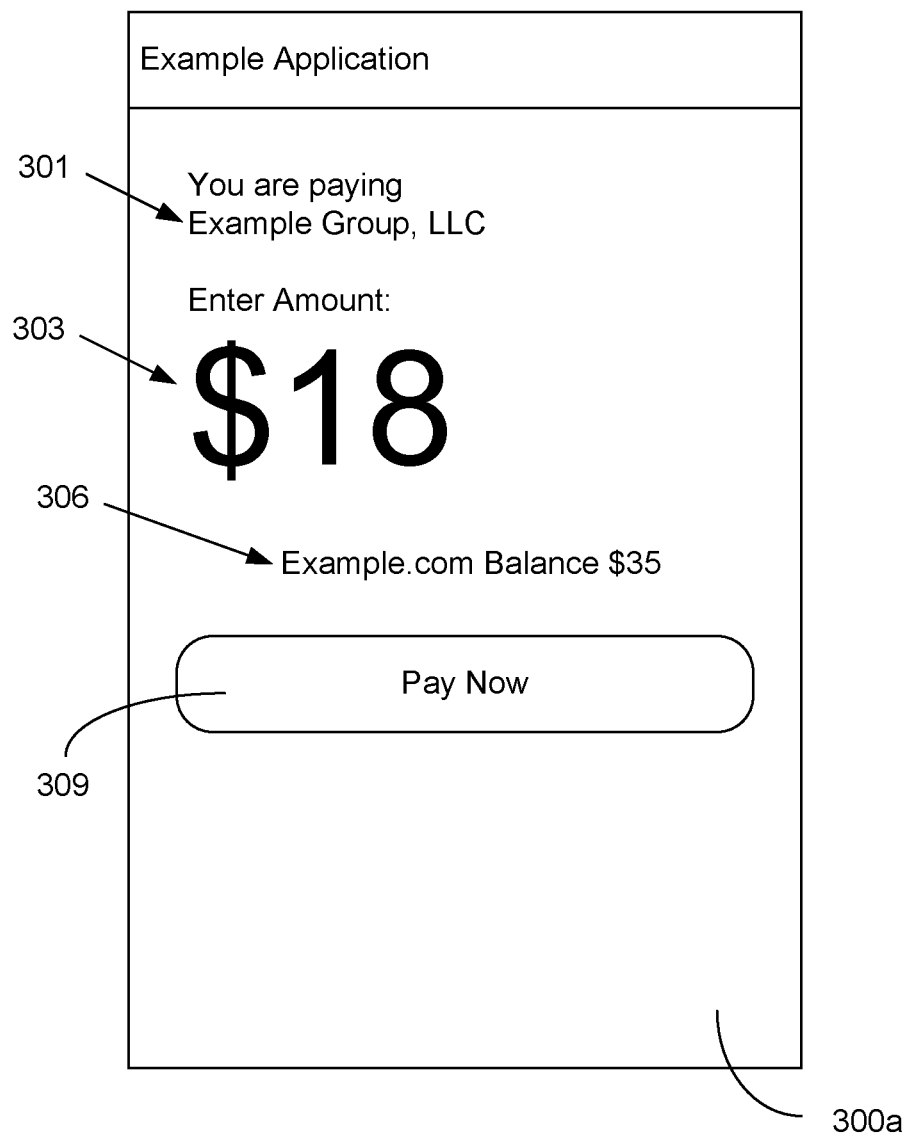
FIGS. 3A-3C are pictorial diagrams of example user interfaces rendered by a client computing device in the networked environment of FIG. 2 according to various embodiments of the present disclosure.

Referring next to FIG. 3A, shown is an example user interface 300a that facilitates a user request to perform an authenticated action according to one or more embodiments. In this example, the user interface 300a allows a user, who is authenticated to access a payment account with a payment provider, to request to initiate a payment to a payee 301, "Example Group, LLC." The user interface 300a contains a data entry component 303 that enables the user to specify an amount of the payment. In this example, the amount of the payment is "$18." The user interface 300a displays a current balance 306 of a payment account, which is "$35." A component 309 in the user interface 300a, when selected, causes the payment to be initiated. In this example, the component 309 is a button labeled "Pay Now." Other types of components 309 may be used in other examples.

Figure 3B:
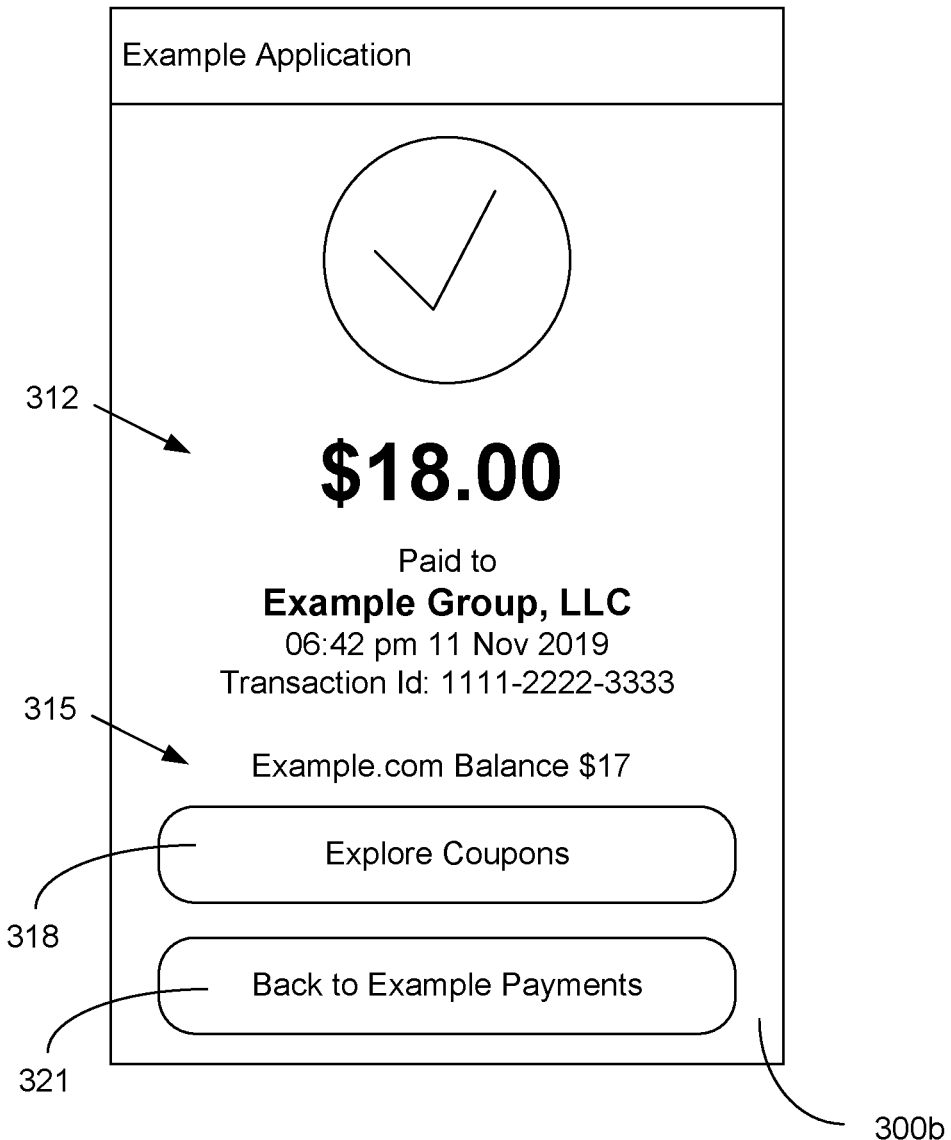

Turning now to FIG. 3B, shown is an example user interface 300b that corresponds to a confirmation user interface that follows the request to perform the authenticated action in FIG. 3A when an Internet connection is available. The user interface 300b includes confirmation information 312 confirming that the payment transaction has been submitted. An updated balance 315 shows the balance of the payment account after the requested payment has been debited. Components 318 and 321 allow the user to move on to perform additional interactive functionality, such as viewing coupons or returning to a menu to perform other functions.

Figure 3C:
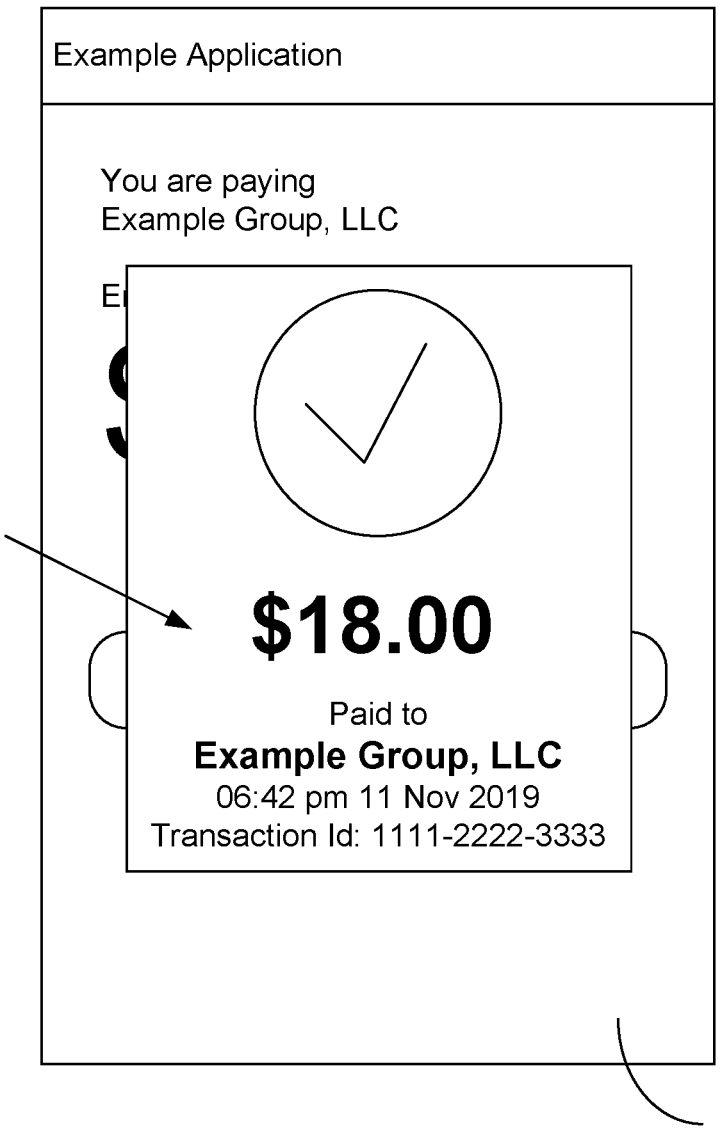

Moving on to FIG. 3C, shown is an example user interface 300c that corresponds to a confirmation user interface that follows the request to perform the authenticated action in FIG. 3A when an Internet connection is not available. As the Internet connection is not available, the authenticated action is performed using the separate communication channel 215 (FIG. 2).

In this example, the user interface 300c differs from the user interface 300b in that it has been simplified. As interactive functionality via the communication channel 215 may be limited due to the unavailability of an Internet connection, the components 318 and 321 have been omitted from the user interface 300c. Simplifying the user interface 300c may help the user locate information and perform tasks more efficiently. For example, the simplified user interface 300c makes better use of the limited display area of a mobile device and presents only actionable information and links, as opposed showing information that may be irrelevant without Internet access and including links that may not work without Internet access. This also helps to reduce latency by not sending unnecessary information over the separate communication channel 215 or a non-functional network connection. For example, if the user were to manipulate a non-functional link, the client computing device 209 (FIG. 2) may attempt to communicate and wait for a response (e.g., resource unavailable, time out, etc.).

Alternative components to launch or display cached or other local functionality may be provided in other examples. In this case, the confirmation information 312 is displayed as a pop-up or pop-over window, which is superimposed over the content of the user interface 300a. Such a pop-up window is not required, however, and is used to illustrate that the user interface 300c may differ from the user interface 300b. In some implementations, the user interface 300c may appear indistinguishable from the user interface 300b.

Further, the updated balance 315 is omitted, as the updated balance 315 may not be available through the communication channel 215. Nonetheless, the return confirmation sent via the communication channel 215 may include the updated balance 315 and/or other information, which may be shown as part of the confirmation information 312.

In one embodiment, data scanned in through a machine-readable code, such as a two-dimensional barcode (e.g., a quick-response (QR) code) or an optical code, as part of initiating the user request to perform the authenticated action may be used to populate the confirmation information 312. As a non-limiting example, such data may correspond to a coupon or offer through a particular merchant, and the user interface 300c may display details of the coupon or offer. Alternatively, additional data may be made available to the client computing device 209 via a local, non-Internet connection. For example, data regarding potential coupons may be sent via near-field communication, BLUETOOTH, etc., potentially as a beacon service, and this data may be used to populate the confirmation information 312 or to render additional components in the user interface 300c.

As another example, if the client computing device 209 has no Internet access and the user wishes to make a payment using USSD, the user may be required to exit a current application, switch to a phone application, and manually enter some predefined code that may be hard to remember (e.g., "*13642506 #"). The user interface 300c as generated by embodiments of the present disclosure greatly simplifies and improves upon such a manual use of USSD. If the client application 248 (FIG. 2) detects that there is not an Internet connection, the client application 248 can automatically establish a two-way USSD communication channel to enable the functionality. There is no need to switch to a different application, and the use of USSD happens transparently on behalf of the user with the user's consent.

Figure 4:
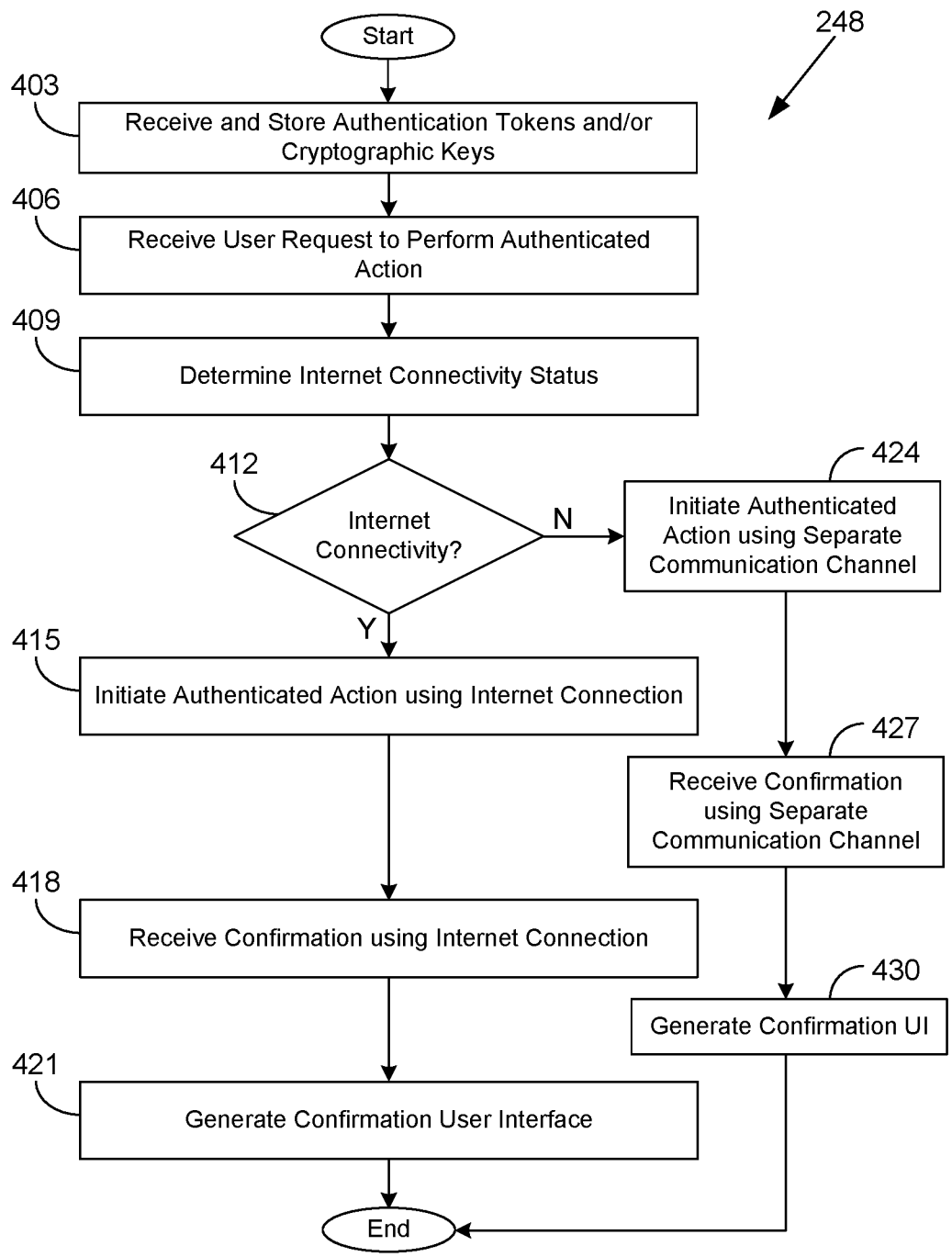
FIG. 4 is a flowchart illustrating one example of functionality implemented as portions of a client application executed in a client computing device in the networked environment of FIG. 2 according to various embodiments of the present disclosure.

Referring next to FIG. 4, shown is a flowchart that provides one example of the operation of a portion of the client application 248 according to various embodiments. It is understood that the flowchart of FIG. 4 provides merely an example of the many different types of functional arrangements that may be employed to implement the operation of the portion of the client application 248 as described herein. As an alternative, the flowchart of FIG. 4 may be viewed as depicting an example of elements of a method implemented in the client computing device 209 (FIG. 2) according to one or more embodiments.

Beginning with box 403, the client application 248 receives and stores one or more cryptographic keys 224 (FIG. 2) and/or one or more authentication tokens 227 (FIG. 2) from the web service 221 (FIG. 2) via the network 212 (FIG. 2), when the Internet connection between the client computing device 209 and the computing environment 203 (FIG. 2) is available. For example, the client application 248 may obtain the cryptographic keys 224 and/or the authentication tokens 227 over Wi-Fi or mobile data. To obtain the cryptographic keys 224 and/or the authentication tokens 227, the client application 248 is in an authenticated state with the web service 221. For example, a user may supply a username and password or other type of credential, or a long-lived registration credential may be stored on the client computing device 209 and used to authenticate with the web service 221. The cryptographic keys 224 and/or the authentication tokens 227 may be retrieved periodically, in response to an event, or on an as-needed basis.

In box 406, the client application 248 receives a user request to perform an authenticated action. Such an authenticated action may correspond to placing an order, cancelling an order, requesting a refund, making a payment, adding an item to a shopping cart or other list, removing an item from a shopping cart or other list, changing user account settings (e.g., adding, removing, or modifying telephone numbers, email addresses, payment instruments, mailing addresses, etc.), enabling parental controls, disabling parental controls, modifying parental controls, and/or other types of actions respecting a user account for which authentication is necessary. To submit the user request, the user may click a button, make a gesture, activate an accelerometer, provide a voice command, or perform another action. In some cases, the request to perform the authenticated action may be originated automatically by the client application 248 (e.g., according to a schedule or in response to an event).

In box 409, the client application 248 determines the Internet connectivity status of the client computing device 209. For example, the client application 248 may determine if an Internet connection is generally available, such as Wi-Fi being turned on and an access point being accessible, or mobile data being turned on. The client application 248 may also determine the quality of the connection (e.g., signal strength) and/or perform a probe operation to determine whether the web service 221 is accessible via the network 212. In box 412, the client application 248 uses the results from box 409 to determine whether the web service 221 is accessible via the network 212.

If the web service 221 is accessible via the network 212, the client application 248 continues from box 412 to box 415 and initiates the authenticated action via an Internet connection. For example, the client application 248 may make an API call via the network 212 to the web service 221 that requests that the authenticated action be performed. Alternatively, the client application 248 may submit a hypertext transfer protocol (HTTP) GET or POST request to a particular uniform resource locator (URL) to cause the authenticated action to be performed. The client application 248 may supply an authentication token 227 for authentication, and/or the client application 248 may encrypt the data using a cryptographic key 224.

In box 418, the client application 248 receives data encoding a confirmation from the web service 221 using the Internet connection. For example, the data may encode the confirmation information 312 shown in FIG. 3B, which may include, for example, a transaction identifier, a timestamp, shipping data, an amount paid, and/or other information appropriate for the type of authenticated action.

In box 421, the client application 248 generates a confirmation user interface 300b (FIG. 3B) for display. The user interface 300b may include various components to launch additional online or interactive functionality through the client application 248, such as making another payment, browsing an item catalog, placing another order, modifying a recently placed order or payment, viewing a coupon or offer, and so forth. Thereafter, the operation of the portion of the client application 248 ends.

If instead, the client application 248 determines in box 412 that Internet connectivity to the web service 221 is unavailable (e.g., mobile data or Wi-Fi are turned off, the mobile data and/or Wi-Fi signal quality is poor, or a connection request to the web service 221 fails), the client application 248 moves from box 412 to box 424. In box 424, the client application 248 initiates the authenticated action using the separate communication channel 215 (FIG. 2). For example, the client application 248 may generate a USSD message, an SMS message, a voice message, etc. to be sent through the communication channel 215. The message may include an identifier of the type of requested action along with an authentication token 227. In some cases, the message may be encrypted using a cryptographic key 224.

In box 427, the client application 248 may receive a confirmation using the communication channel 215. For example, the confirmation may correspond to a USSD message, an SMS message, a voice message, etc. The confirmation data may be encrypted, upon which the client application 248 may decrypt the data using the cryptographic key 224. The confirmation may be received via a different non-Internet communication channel 215 in some implementations. For example, if the authenticated action were initiated via USSD, the confirmation may be received via SMS.

In box 430, the client application 248 may generate a confirmation user interface 300c (FIG. 3C) for display to present the confirmation information 312 (FIG. 3C) to the user. The confirmation user interface 300c may include less information or omit components related to interactive or online functionality, relative to the confirmation user interface 300b associated with Internet-based communication. Thereafter, the operation of the portion of the client application 248 ends.

In various scenarios, the client computing device 209 may correspond to a voice interface device. In such a situation, a user may speak commands to the voice interface device which are captured by a microphone of the voice interface device. For instance, the commands may be preceded by a wake word. The voice may be encoded and sent via a network 212 connection for natural language processing by the web service 221. The voice interface device may respond with a synthesized voice confirmation or other response to the command.

If the Internet connection is lost or is unavailable, the client application 248 (FIG. 2) in the voice interface device may use voice-based communication over the communication channel 215. For example, the captured audio may be backhauled as voice or data over a telephone call using the communication channel 215 to the communication channel endpoint 242. A confirmation or response may be transmitted via the communication channel 215 back to the client application 248 for aural presentation.

Figure 5:
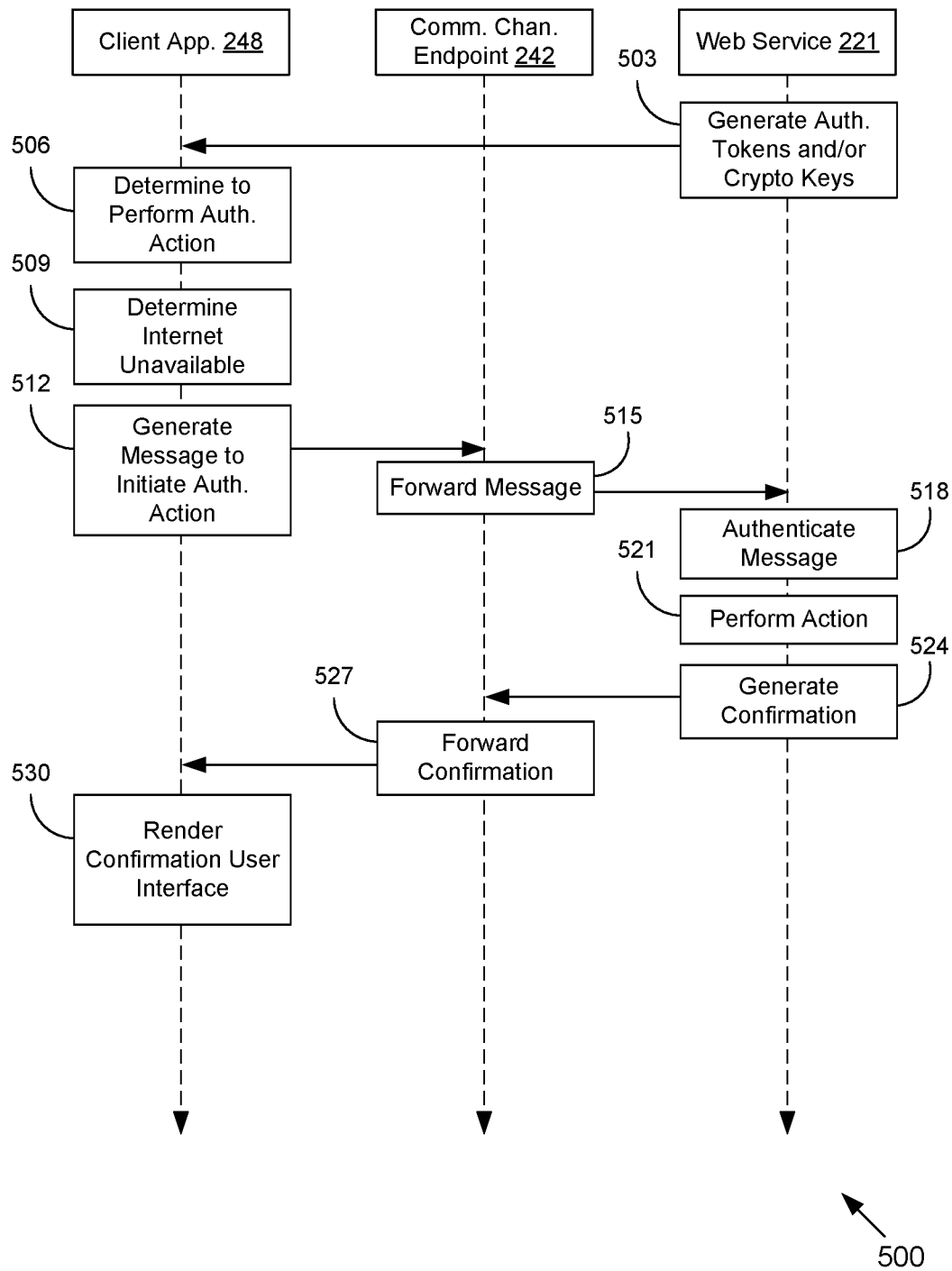
FIG. 5 is a sequence diagram illustrating one example of functionality implemented as portions of the networked environment of FIG. 2 according to various embodiments of the present disclosure.

Continuing to FIG. 5, shown is a sequence diagram 500 that provides one example of the operation and interaction of portions of the client application 248, the communication channel endpoint 242, and the web service 221 according to various embodiments. It is understood that the sequence diagram 500 provides merely an example of the many different types of functional arrangements that may be employed to implement the operation of the portions of the client application 248, the communication channel endpoint 242, and the web service 221 as described herein.

Beginning with box 503, the web service 221 generates one or more authentication tokens 227 (FIG. 2) and/or cryptographic keys 224 (FIG. 2) and sends them to the client application 248 via an Internet connection through the network 212 (FIG. 2). The Internet connection may employ User Datagram Protocol (UDP), Transmission Control Protocol (TCP), Internet Protocol (IP), Hypertext Transfer Protocol (HTTP), and/or other associated protocols. In box 506, the client application 248 determines to perform an authenticated action. For example, a user may have requested to perform the authenticated action by interacting with a user interface, such as the user interface 300a (FIG. 3A). For example, the user may have employed the client application 248 to scan a two-dimensional barcode displayed at a merchant in order to make a payment to that merchant. Alternatively, the client application 248 may determine to perform the authenticated action automatically.

In box 509, the client application 248 determines that an Internet connection via the network 212 is unavailable to the client computing device 209 (FIG. 2). For example, Wi-Fi and/or mobile data may be turned off or the signal quality may be poor. In another example, the client application 248 or a web service may monitor or otherwise have information respecting the congestion of networks. On the basis of this congestion information and a configurable threshold, the client application 248 may deem the Internet connection to be unavailable and then switch to a separate communication channel 215 (FIG. 2) such as USSD.

Furthermore, mobile network operators may employ various embodiments to help reduce latencies on their networks by better distributing the load through other channels, such as USSD. In such a case, the mobile network operator may notify the client application 248 that the Internet access is unavailable or that USSD should be used instead. The client application 248 may also determine to use the communication channel 215 based on the suitability of using the communication channel 215 for the content, the relative signal strength of the communication channel 215 at the client computing device 209, and/or other factors.

In box 512, the client application 248 generates one or more messages to initiate the authenticated action. To this end, the client application 248 may include one of the authentication tokens 227 in the message. The client application 248 may encrypt the message using a cryptographic key 224, such as a symmetric key. The client application 248 sends the message to the communication channel endpoint 242 via the communication channel 215. To this end, the client application 248 may send the message as a USSD message, SMS message, voice message, etc.

In box 515, the communication channel endpoint 242 receives the message via the communication channel 215 and then forwards the message to the web service 221 via the network 212. To this end, the communication channel endpoint 242 may identify a particular web service 221 that is associated with the requested action. For example, the message may include an unencrypted identifier associated with the particular web service 221 and/or the type of message or action. The message may be forwarded via HTTPS using an API via the network 212. Specifically, it is noted that an Internet connection may be available between the communication channel endpoint 242 and the web service 221, even when the Internet connection between the web service 221 and the client computing device 209 is not available.

In box 518, the web service 221 receives the message and authenticates it. For example, the web service 221 may decrypt the message and/or validate the authentication token 227 included in the message. In box 521, the web service 221 causes the requested action to be performed. In box 524, the web service 221 may generate a confirmation and send the confirmation to the communication channel endpoint 242 via the network 212. The confirmation may be encrypted using a cryptographic key 224. In addition, the confirmation may be transmitted using HTTPS.

In box 527, the communication channel endpoint 242 receives the confirmation from the web service 221 and forwards the confirmation to the client application 248 using the communication channel 215. In box 530, the client application 248 may receive the confirmation message via the communication channel 215 and then may render a confirmation user interface 300c (FIG. 3C) for display. The confirmation user interface 300c may include data based at least in part on data extracted from a two-dimensional barcode scanned by the client computing device 209. Thereafter, the sequence diagram 500 ends.

Figure 6:
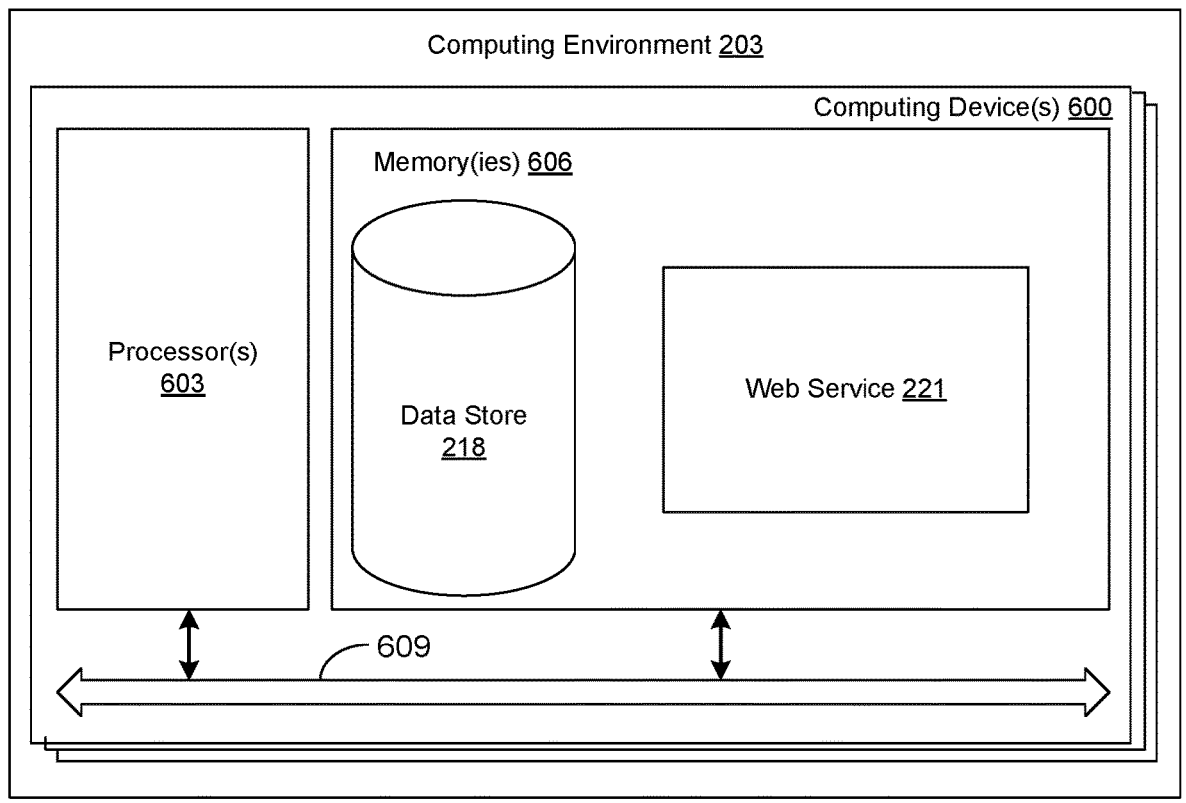
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 is the web service 221 and potentially other applications. Also stored in the memory 606 may be a data store 218 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the web service 221, the communication channel endpoint 242 (FIG. 2), the client application 248 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 and the sequence diagram of FIG. 5 show the functionality and operation of an implementation of portions of the web service 221, the communication channel endpoint 242, and the client application 248. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 4 and the sequence diagram of FIG. 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the web service 221, the communication channel endpoint 242, and the client application 248, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the web service 221, the communication channel endpoint 242, and the client application 248, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a mobile computing device, wherein when executed the program causes the mobile computing device to at least:
   receive a cryptographic key using an Internet connection to a web service;
   receive a first user request to perform a first authenticated action;
   in response to receiving the first user request, determine that the Internet connection to the web service is available;
   in response to determining that the Internet connection to the web service is available, initiate the first authenticated action based at least in part on sending a first message to the web service via the Internet connection;
   receive a second user request to perform a second authenticated action;
   in response to receiving the second user request, determine that the Internet connection to the web service is unavailable;
   encrypting a second message using the cryptographic key; and
   in response to determining that the Internet connection to the web service is unavailable, initiate the second authenticated action without switching to a different application, the second authenticated action being initiated based at least in part on sending the encrypted second message to a mobile network operator service using Unstructured Supplementary Service Data (USSD).

2. The non-transitory computer-readable medium of claim 1, wherein the first authenticated action and the second authenticated action comprise at least one of: a payment action, an order placement action, or a shopping cart modification action.

3. The non-transitory computer-readable medium of claim 1, wherein when executed the program further causes the mobile computing device to at least:

generate a first confirmation user interface in response to receiving a first confirmation via the Internet connection that the first authenticated action has been performed; and generate a second confirmation user interface in response to receiving a second confirmation via USSD that the second authenticated action has been performed, wherein the second confirmation user interface excludes a particular functionality included in the first confirmation user interface.

4. The non-transitory computer-readable medium of claim 1, wherein when executed the program further causes the mobile computing device to at least:

determine the second authenticated action based at least in part on first data scanned from a two-dimensional barcode; and generate a confirmation user interface in response to receiving a confirmation that the second authenticated action has been performed, the confirmation user interface generated based at least in part on second data scanned from the two-dimensional barcode.

5. The non-transitory computer-readable medium of claim 1, wherein when executed the program further causes the mobile computing device to at least receive the second user request from another mobile computing device connected to the mobile computing device via a personal area network connection.

6. The non-transitory computer-readable medium of claim 1, wherein when executed the program further causes the mobile computing device to at least:

receive an authentication token using the Internet connection; and include the authentication token in the second message.

7. A system, comprising:

a first computing device; and an application executable in the first computing device, wherein when executed the application causes the first computing device to at least:

receive a cryptographic key via an Internet connection to a second computing device; and determine that a first authenticated action is to be performed;

determine that the Internet connection to the second computing device is available;

initiate the first authenticated action based at least in part on sending a first message to the second computing device via the Internet connection determine that a second authenticated action is to be performed;

determine that the Internet connection to the second computing device is unavailable;

encrypt at least a portion of a second message using the cryptographic key; and initiate the second authenticated action without switching to a different application, the second authenticated action being initiated based at least in part on sending the encrypted second message to a third computing device corresponding to a mobile network operator using Unstructured Supplementary Service Data (USSD).

8. The system of claim 7, wherein when executed the application further causes the first computing device to at least:

receive a first confirmation from the second computing device via the Internet connection, the first confirmation indicating that the first authenticated action has been performed; and receive a second confirmation from the third computing device via a non-Internet channel, the second confirmation indicating that the second authenticated action has been performed.

9. The system of claim 8, wherein when executed the application further causes the first computing device to at least:

generate a first user interface that presents the first confirmation and includes at least one component to cause network content to be requested by the application; and generate a second user interface that presents the second confirmation and omits the at least one component.

10. The system of claim 7, wherein when executed the application further causes the first computing device to at least:

receive a plurality of authentication tokens via the Internet connection; and include a particular authentication token from the plurality of authentication tokens in the second message.

11. The system of claim 7, wherein when executed the application further causes the first computing device to at least receive a request to perform the second authenticated action from a fourth computing device connected to the first computing device via a personal area network connection.

12. The system of claim 7, wherein the first authenticated action and the second authenticated action comprise at least one of: a payment action, an order placement action, or a shopping cart modification action.

13. A method, comprising:

receiving, via the first computing device, a cryptographic key using an Internet connection;

determining, via a first computing device, that an authenticated action is requested to be performed;

determining, via the first computing device, that Internet connectivity is unavailable to the first computing device; and encrypting, via the first computing device, a message using the cryptographic key; and initiating, via the first computing device, the authenticated action without switching to a different application using a communication channel that connects the first computing device to a second computing device, wherein the Internet is inaccessible through the communication channel, wherein initiating the authenticated action further comprises sending the encrypted message to the second computing device via Unstructured Supplementary Service Data (USSD).

14. The method of claim 13, wherein the authenticated action comprises a first authenticated action, and the method further comprises:

determining, via the first computing device, that a second authenticated action is requested to be performed;

determining, via the first computing device, that the Internet connectivity is available to the first computing device; and initiating, via the first computing device, the second authenticated action using an Internet connection to a third computing device.

15. The method of claim 13, further comprising:

receiving, via the first computing device, an authentication token using the Internet connection prior to determining that the Internet connectivity is unavailable to the first computing device; and generating, via the first computing device, the message to include the authentication token.

16. The method of claim 13, further comprising:
receiving, via the first computing device, a confirmation using the communication channel that the authenticated action has been performed; and
causing, via the first computing device, a user interface including the confirmation to be presented.

17. The method of claim 13, wherein determining that the authenticated action is requested to be performed further comprises receiving, via the first computing device, a user request to perform the authenticated action via a user interface.

18. The method of claim 13, wherein the second computing device corresponds to a mobile network operator.

19. The method of claim 13, further comprising:
receiving, via the first computing device, a confirmation that the second authenticated action has been performed via a different communication channel; and
causing, via the first computing device, a user interface including the confirmation to be presented.

20. The method of claim 13, wherein the first authenticated action and the second authenticated action comprise at least one of: a payment action, an order placement action, or a shopping cart modification action.

* * * * *